United States Patent
DeCuir (10) Patent No.: US 9,797,195 B2
(45) Date of Patent: Oct. 24, 2017

(54) FASTENING APPARATUS (71) Applicant: Joseph E. DeCuir, Las Vegas, NV (US)

(72) Inventor: Joseph E. DeCuir, Las Vegas, NV (US)

( * ) Notice: Subject to any disclaimer, the term of this patent is extended or adjusted under 35 U.S.C. 154(b) by 0 days.

(21) Appl. No.: 15/089,483

(22) Filed: Apr. 2, 2016

(65) Prior Publication Data
US 2016/0369564 A1    Dec. 22, 2016

Related U.S. Application Data (60) Provisional application No. 62/230,974, filed on Jun. 22, 2015.

(51) Int. Cl.
*E04G 25/00* (2006.01)
*E06C 7/48* (2006.01)
*F16B 2/12* (2006.01)

(52) U.S. Cl.
CPC ............... *E06C 7/486* (2013.01); *F16B 2/12* (2013.01)

(58) Field of Classification Search
USPC ....................................................... 248/354.1
See application file for complete search history.

(56) References Cited

U.S. PATENT DOCUMENTS

| | | | | |
|---|---|---|---|---|
| 1,374,060 A * | 4/1921 | Chute | ..................... | E06C 7/486 182/107 |
| 2,256,452 A * | 9/1941 | Marshall | ................... | E06C 7/48 182/214 |
| 3,268,196 A * | 8/1966 | Anton, Sr. | .............. | E06C 7/486 182/107 |
| 4,090,587 A * | 5/1978 | Pyle | ......................... | E06C 7/48 182/206 |
| 4,926,722 A * | 5/1990 | Sorensen | ................ | B25B 5/068 269/166 |
| 6,550,577 B1 * | 4/2003 | Allgire | .................... | E06C 7/486 182/107 |
| 6,837,338 B2 * | 1/2005 | Grover | ...................... | E06C 7/48 182/107 |
| 7,140,582 B1 * | 11/2006 | Miller | ..................... | B25B 5/068 248/229.22 |
| 8,316,993 B1 * | 11/2012 | Rudd | ........................ | E06C 7/48 182/107 |
| 2006/0054390 A1 * | 3/2006 | Ray | ......................... | E06C 7/486 182/107 |
| 2006/0124394 A1 * | 6/2006 | Bracken | ................... | E06C 1/34 182/107 |

(Continued)

*Primary Examiner* — Monica Millner (57) ABSTRACT

A fastening apparatus detachably and simultaneously joins with a climbing assembly and a mounting surface to maintain a secure connection there between. A rod comprises a distal end and a proximal end that joins the climbing assembly. An anchor portion comprises a base and a wall that joins the mounting surface. A distal coil winds around the rod to create tension between the proximal end and the wall. A locking member incrementally engages and remains engaged with a section of the rod while being displaced in a fastening direction. This forms a ratcheting mechanism that incrementally displaces the proximal end towards the wall, creating an inward and downward tension between the mounting surface and the climbing assembly. A release portion disengages the locking member from the rod so that the proximal end moves in a release direction.

18 Claims, 8 Drawing Sheets

(56) References Cited

U.S. PATENT DOCUMENTS

| | | | | |
|---|---|---|---|---|
| 2006/0272894 A1* | 12/2006 | Hein | ................. | E06C 7/48 |
| | | | | 182/107 |
| 2007/0251762 A1* | 11/2007 | Charlton | ................. | E06C 7/486 |
| | | | | 182/107 |
| 2009/0145693 A1* | 6/2009 | Arseneault | ................. | E06C 7/486 |
| | | | | 182/206 |
| 2013/0199873 A1* | 8/2013 | Prentice | ................. | E06C 7/486 |
| | | | | 182/107 |
| 2014/0014797 A1* | 1/2014 | McSherry | ................. | F16B 2/12 |
| | | | | 248/231.41 |
| 2014/0166397 A1* | 6/2014 | Reynolds | ................. | E06C 7/188 |
| | | | | 182/107 |
| 2014/0174853 A1* | 6/2014 | Charlton | ................. | E06C 7/486 |
| | | | | 182/107 |
| 2015/0191976 A1* | 7/2015 | Mosier | ................. | E06C 7/188 |
| | | | | 182/107 |
| 2015/0354279 A1* | 12/2015 | Colon | ................. | E06C 7/14 |
| | | | | 248/210 |
| 2015/0375369 A1* | 12/2015 | Noniewicz | ................. | F16B 2/185 |
| | | | | 24/528 |
| 2016/0153234 A1* | 6/2016 | Mazanek | ................. | E06C 7/06 |
| | | | | 182/129 |
| 2016/0281428 A1* | 9/2016 | Rudd | ................. | E06C 7/48 |

\* cited by examiner

FASTENING APPARATUS

CROSS-REFERENCE TO RELATED APPLICATIONS

The present Utility patent application claims priority benefit of the U.S. provisional application for patent Ser. No. 62/230,974 entitled "LADDER GUARDIAN", filed on 22 Jun. 2015 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a fastening apparatus that detachably and simultaneously joins with a climbing assembly and a mounting surface to maintain a secure connection there between; whereby the fastening apparatus utilizes a ratcheting mechanism to incrementally apply an inward and downward tension between a mounting surface and a climbing assembly to secure the mobile climbing assembly at a predetermined position against the mounting surface, and also utilizing a release portion to enable quick release of the ratcheting mechanism, such that the climbing assembly may disengage from the mounting surface.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a ladder is a vertical or inclined set of rungs. There are two types of ladders: a rigid ladder that can be leaned against a vertical surface such as a wall, and rope ladder that is hung from an elevated mounting surface top. Rigid ladders are usually portable, but some types are permanently fixed to buildings.

Typically, a ladder is used to obtain access to a roof or ceiling of a building. The ladder is also used to access roof-mounted air conditioning and/or evaporation units, aerial antennas, to perform roof repairs, or for any other reason for which access to the roof may be required.

It is known that the typical method of using a ladder to obtain access to the roof consists of simply propping the ladder against the leading edge of the roof in such a manner that the side rails of the ladder are in direct contact with the material comprising the roof top layer.

It is recognized that safety is an important factor to consider in using a ladder to obtain access to a roof. Unless the ladder is properly supported when being ascended or descended (either by incorporating the help of a separate person to hold the ladder or by using other means), using a ladder to obtain access to a roof is a source of preventable injury caused. For example, by the ladder tipping away from the roof or laterally sliding from its supported position.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A and 5B illustrate perspective views of displacement of a rod, where FIG. 5A illustrates a rod being displaced in an exemplary release direction.

FIGS. 6A and 6B illustrate perspective views of a fastening apparatus fastening an exemplary climbing assembly to an exemplary mounting surface, where FIG. 6A illustrates a rod being displaced in an exemplary release direction.

FIGS. 7A and 7B illustrate perspective views of a fastening apparatus fastening an exemplary climbing assembly to an exemplary mounting surface, where FIG. 7A illustrates a view from beneath a mounting surface.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rocklatex Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter.", e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

Figure 1:
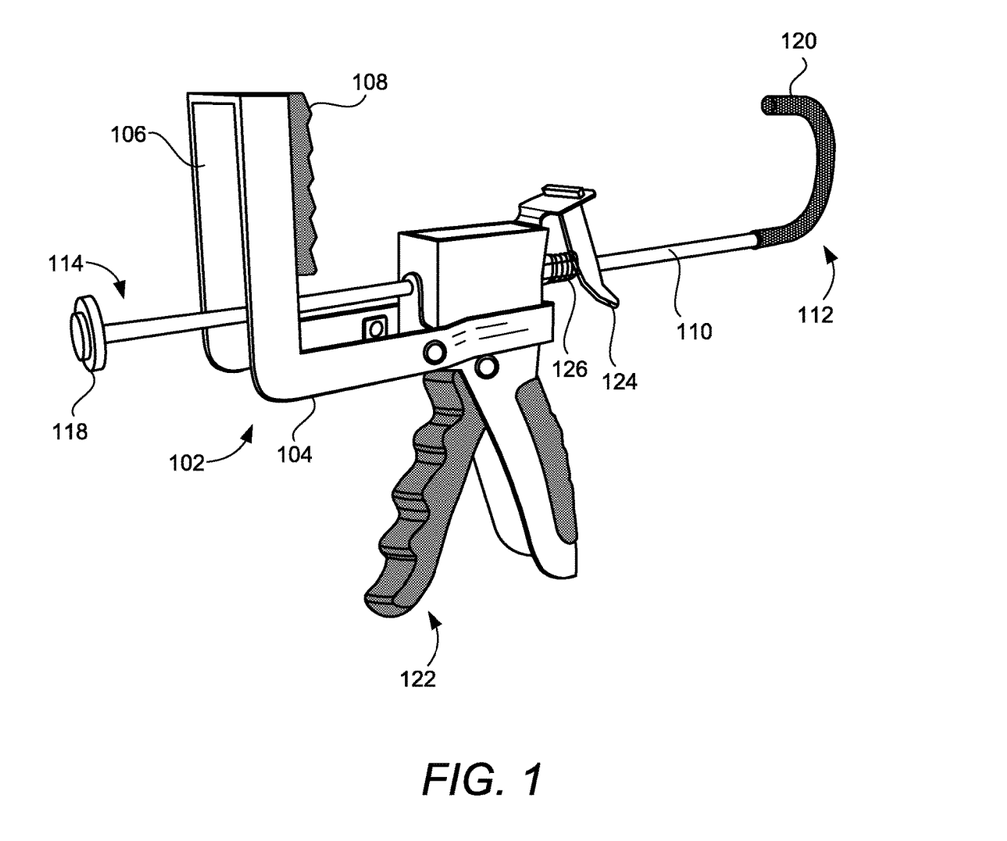
FIG. 1 illustrates a perspective view of an exemplary fastening apparatus, in accordance with an embodiment of the present invention.

There are various types of fasteners for securing a ladder to a roof eave that may be provided by preferred embodiments of the present invention. FIG. 1 illustrates a perspective view of an exemplary fastening apparatus 100. In one embodiment, the fastening apparatus may detachably and simultaneously join with a climbing assembly and a mounting surface to maintain a secure connection there between. The fastening apparatus is configured to create an inward and downward tension between the climbing assembly and the mounting surface so as to provide a secure attachment there between. The fastening apparatus may utilize a ratcheting mechanism to create the necessary tension, and a release mechanism to release the tension and disengage the climbing assembly from the mounting surface.

In some embodiments, the fastening apparatus may include a rod 110. The rod comprises a distal end 114 and a proximal end 112. The proximal end detachably joins the climbing assembly. A sleeve 120 may receive the proximal end for enhancing grip. A terminal portion 118 may position terminally on the distal end of the rod. In some embodiments, the fastening apparatus further comprises an anchor portion 102 comprises a base 104 and a wall 106. The wall is configured to join with the mounting surface. A grip portion 108 enhances the grip between wall and mounting surface. The grip portion may include at least one sloped ridge.

In some embodiments, a distal coil winds around the rod to create tension between the proximal end and the wall. A locking member incrementally engages and remains engaged with the rod while being displaced in a fastening direction. The locking member creates a frictional engagement with a section of the rod as it is being displaced along the length of the rod. This forms a ratcheting effect that incrementally displaces the proximal end towards the wall, creating an inward and downward tension between the mounting surface and the climbing assembly.

In some embodiments, a handle portion 122 may be configured to urge the rod towards the fastening direction. A release portion 124 may disengage the locking member from the rod so that the proximal end of the rod moves in a release direction. This is accomplished as friction is slowly reduced between the rod and the release portion. A proximal coil 126 creates a secondary tension to maintain the release portion in a rest positon until a force is applied thereto.

The fastening apparatus may also provide a release portion that operatively connects to the ratcheting mechanism. The release portion may be manipulated to release the inward and downward tension from the ratcheting mechanism. By releasing the tension, the climbing assembly and the mounting surface may be disengaged from each other.

The fastening apparatus may be configured to enable efficient, one-handed fastening and release between the climbing assembly and the mounting surface. In some embodiments, the climbing assembly may include, without limitation, a ladder having a plurality of rungs, a step ladder, a scaffold, and a catwalk. The mounting surface may include, without limitation, a roof eave, a tree having branches, a framework of a building, a boat, and an airplane.

Figure 2:
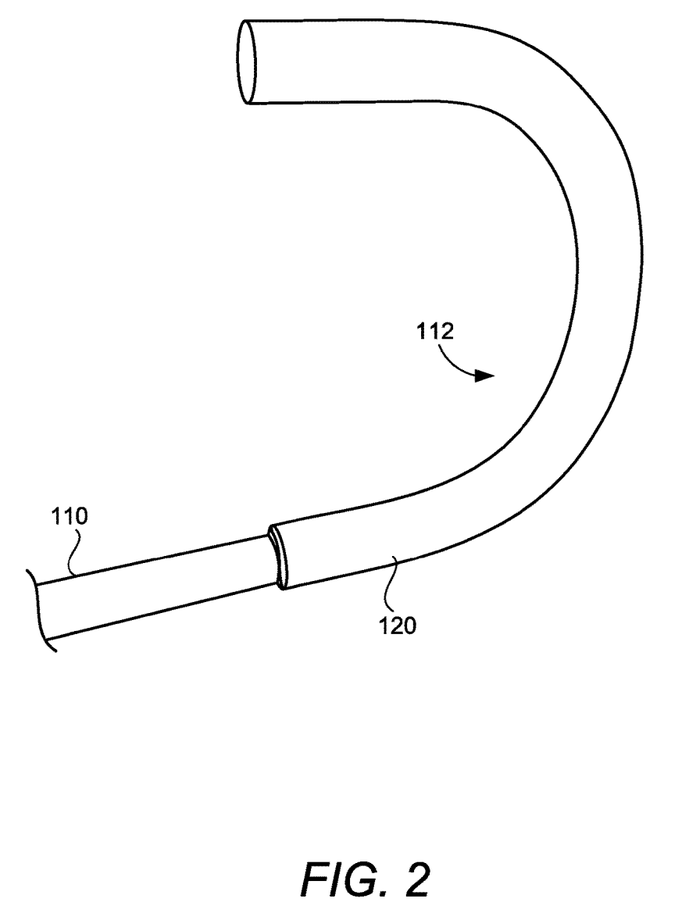
FIG. 2 illustrates a close up view of an exemplary proximal end of a rod, in accordance with an embodiment of the present invention.

FIG. 2 illustrates a close up view of an exemplary proximal end of a rod, in accordance with an embodiment of the present invention. In one aspect, the fastening apparatus may include a rod having a proximal end and a distal end. The rod is the mobile component of the fastening apparatus and forms the structural backbone for maintaining an inward and downward tension between the climbing assembly and the mounting surface. In one embodiment, the rod is approximately 12" length and ¼" in diameter. Suitable materials of the rod may include, without limitation, stainless steel, tool steel, and aluminum/aluminum alloy, a rigid polymer, and wood.

In some embodiments, the rod may be disposed incrementally along a linear path to apply the tension for fastening the climbing assembly to the mounting surface, or release the tension to disengage the climbing assembly from the mounting surface. The proximal end of the rod is configured to detachably join the climbing assembly. The proximal end may be configured to join with a portion of the climbing assembly without interfering with a user who is operating the climbing assembly. In one embodiment, the proximal end comprises a generally hook shape that easily engages and disengages from a rung on the climbing assembly.

Though in other embodiments, any number of shapes, such as clamps, wedges, and the like may be used by the proximal end. In one embodiment, a sleeve may receive the proximal end. The sleeve may be configured to enhance the grip between the proximal end and the climbing assembly. Suitable materials for the sleeve may include, without limitation, thermoplastic urethane, polyurethane, and rubber.

The distal end of the rod may include a terminal portion, such as a disc. Through linear displacement by the rod, the terminal portion is incrementally urged in a direction proximal to the mounting surface as the inward and downward tension is applied between the mounting surface and the climbing assembly. The position of the terminal portion relative to the mounting surface may be used to gauge the distance between the climbing assembly and the mounting surface.

In one embodiment, the terminal portion abuts the mounting surface. This abutment indicates that the fastening apparatus cannot continue applying the tension. In some embodiments, the fastening apparatus detachably attaches to the mounting surface through an anchor portion. The anchor portion may be configured to detachably attach to the mounting surface. The anchor portion may be stationary relative to the rod. Thus, through linear displacement of the rod, the proximal end of the rod selectively moves towards and away from the anchor portion.

Figure 3:
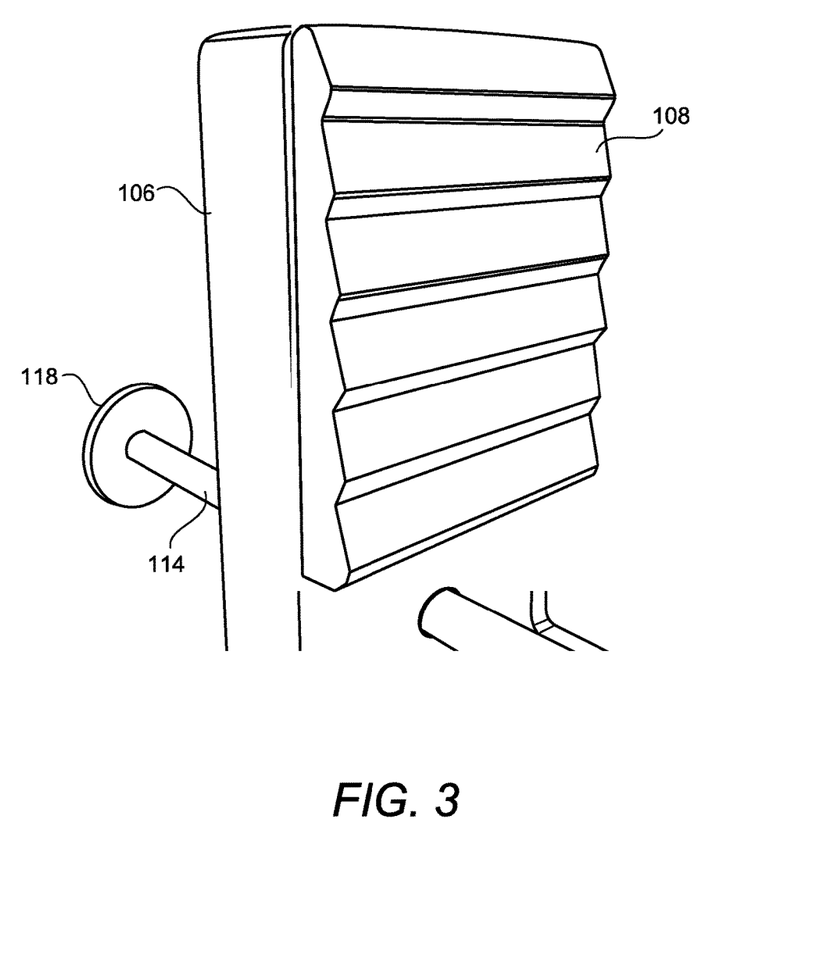
FIG. 3 illustrates a close up view of an exemplary wall of an exemplary anchor portion, in accordance with an embodiment of the present invention.

FIG. 3 illustrates a close up view of an exemplary wall of an exemplary anchor portion. In one aspect, the anchor portion may include an L-bracket defined by a base and a wall. The wall may be slightly angled in relation to the base, such that a perfect 90° angle does not form there between. In some embodiments, the wall may engage the mounting surface. In one embodiment, the base is about 5" long and the wall is about 4 inches long. In one embodiment, the mounting surface is a roof eave that forms a generally coplanar disposition with the wall during engagement.

In some embodiments, a grip portion may overlay the wall to enhance the engagement between the wall and the mounting surface. In one possible embodiment, the grip portion may include a textured thermoplastic urethane. This textured thermoplastic urethane platform measures approximately two inches in length by two inches in width by one-half inch in depth.

Thus, the proximal end of the rod is displaced towards the wall to increase the tension between the climbing assembly and the mounting surface. It is significant o note that in one embodiment, the proximal end may be disposed at a slightly higher elevation than the wall, such that an inward and downward tension is generated between the climbing assembly and the mounting surface. Conversely, the proximal end of the rod is displaced away from the wall to release the tension between the proximal end of the rod and the wall of the anchor portion; thereby enabling disengagement between the climbing assembly from the mounting surface.

Figure 4:
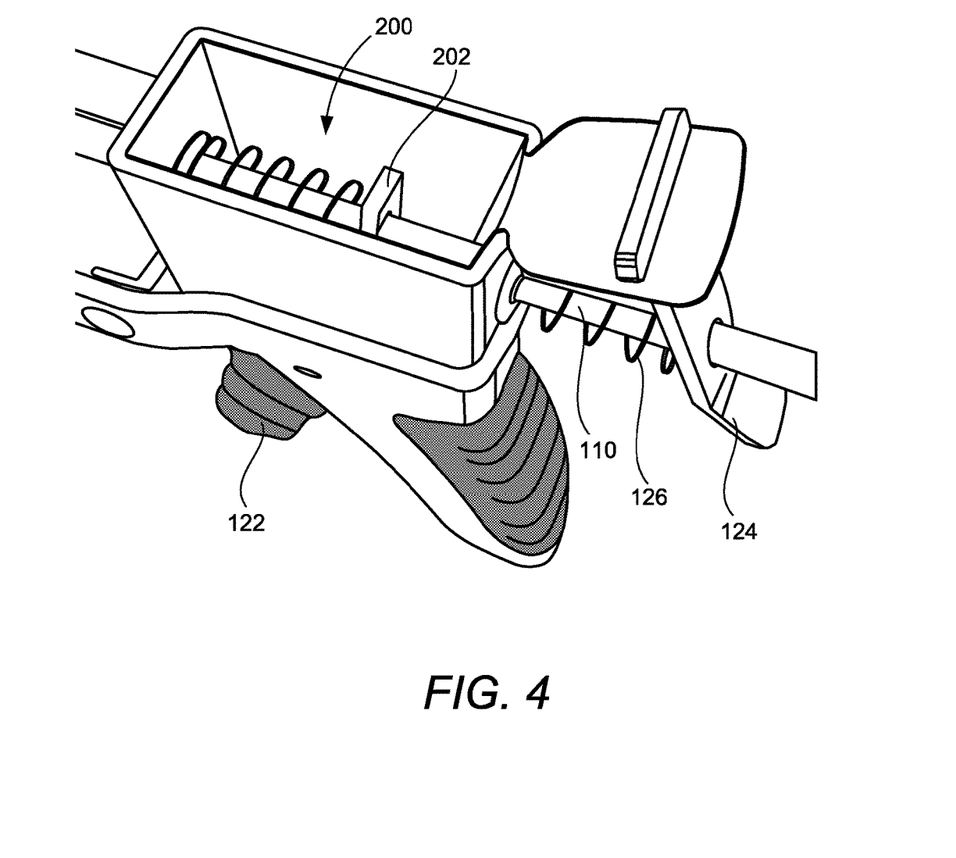
FIG. 4 illustrates a close up view of an exemplary distal coil generating tension along an exemplary rod, in accordance with an embodiment of the present invention.

FIG. 4 illustrates a close up view of an exemplary distal coil generating tension along an exemplary rod. In one aspect, a ratcheting mechanism enables incremental displacement of the rod, and thereby the proximal end towards the wall of the anchor portion. In one possible embodiment, the ratcheting mechanism comprises a distal coil 200 and a locking member 202. The locking member selectively engages along the length of the rod to apply the incremental tension. As the locking member moves towards the wall in a fastening direction, the locking member engages and remains engaged with a section of the rod.

Thus, the fastening apparatus utilizes a unique ratcheting mechanism to incrementally apply an inward and downward tension between the mounting surface and the climbing assembly. The tension is effective for securing the climbing assembly at a predetermined position against the mounting surface.

In one embodiment, a handle portion may operatively connect to the locking member. The handle portion may utilize the base of the anchor portion as a fulcrum to pivot towards and away from the locking member. In this manner, the handle portion may urge the locking member along the rod in the fastening direction, i.e., the proximal end of the rod towards the wall of the anchor portion. The handle portion may be configured, such that it may be manipulated with one hand.

Those skilled in the art will recognize that operating on a ladder requires a three-point-stance, whereby two feet and one hand must remain engaged with the ladder at all times. By enabling manipulation of the handle portion with one hand, the three-point-stance may be maintained. Thus, in one exemplary use of the handle portion, simply squeezing the handle portion may enable the fastening apparatus to securely attach its using ladder to the structure. Once the fastening apparatus is secured to the mounting surface and the climbing assembly applied, a user can work while upon the ladder, or step away from the ladder to access a rooftop and later return to descend, and without any risks of the ladder inadvertently wobbling or falling from the roof.

In some embodiments, a release portion operatively connects to the locking member. The release portion may be manipulated to disengage the locking member from the rod. In this instance, the tensioned distal coil displaces the proximal end away from the anchor portion, such that the proximal end may be disengaged from the climbing assembly, and the wall may be disengaged from the mounting surface. In essence enabling disengagement between the climbing assembly and the mounting surface.

In some embodiments, a proximal coil is disposed to at least partially encapsulate the proximal end of the rod. The proximal coil creates a secondary tension between the release portion and the locking member. The secondary tension maintains the release portion in a neutral position until a force is applied to disengage the locking member from a section along the length of the rod. In essence, the proximal coil makes contact with the release portion, the depression of which releases the securement of the rod.

Figure 5A:
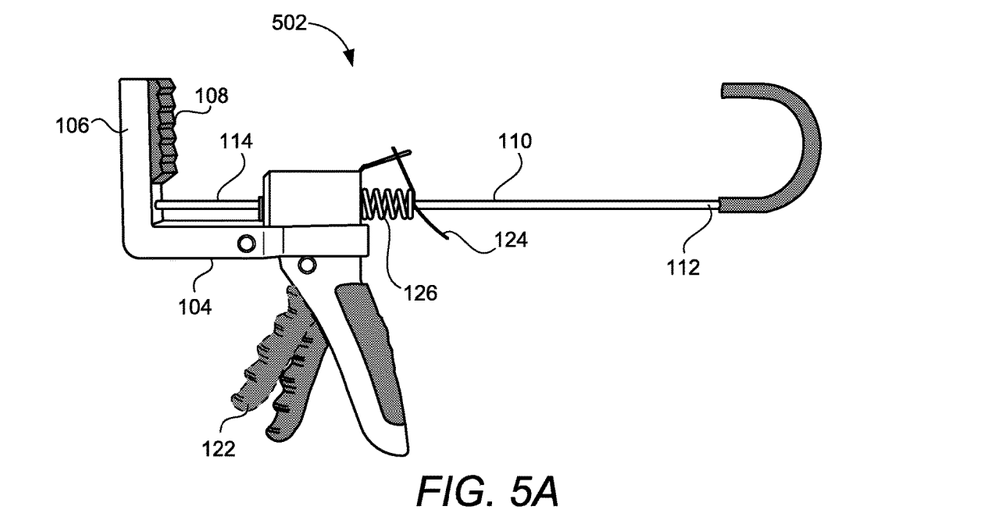
Figure 5B:
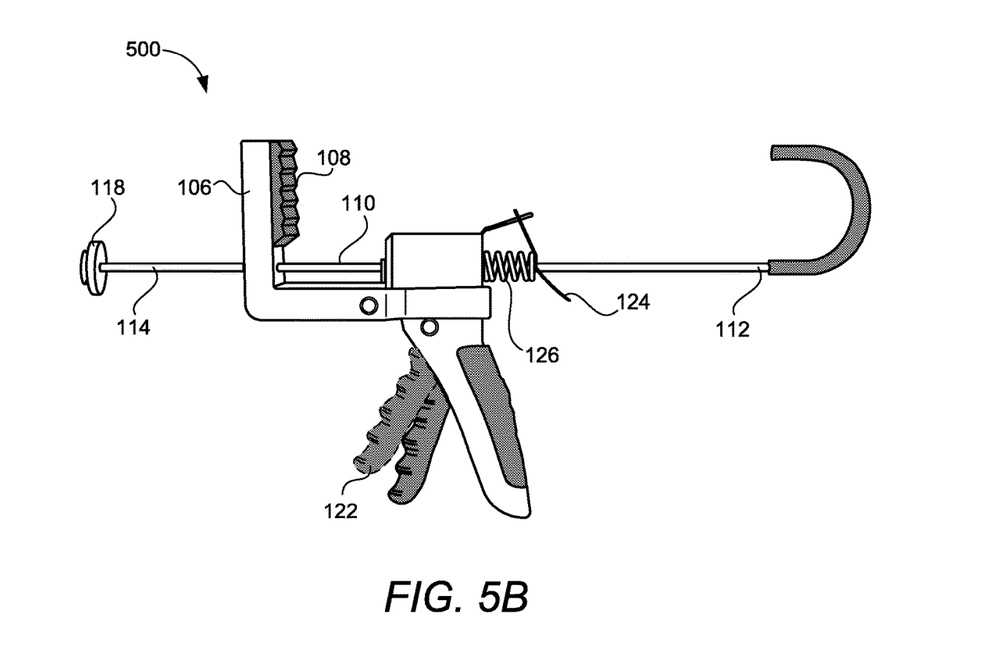
FIG. 5B illustrates a rod being displaced in an exemplary fastening direction, in accordance with an embodiment of the present invention.

FIGS. 5A and 5B illustrate perspective views of displacement of a rod, where FIG. 5A illustrates a rod being displaced in an exemplary release direction, and FIG. 5B illustrates a rod being displaced in an exemplary fastening direction. Thus, as the proximal end of the rod is urged towards the wall of the anchor portion in a fastening direction 500, the linear displacement is unconstrained. This is exemplary of a ratcheting effect. However, the locking member is configured such that linear displacement of the rod in an opposite, release direction 502 is prevented. Further, the distal coil is configured to encapsulate the rod, so as to ensure that the tension between the proximal end of the rod and the wall of the anchor portion increases as the proximal end moves closer to the wall.

Figure 6A:
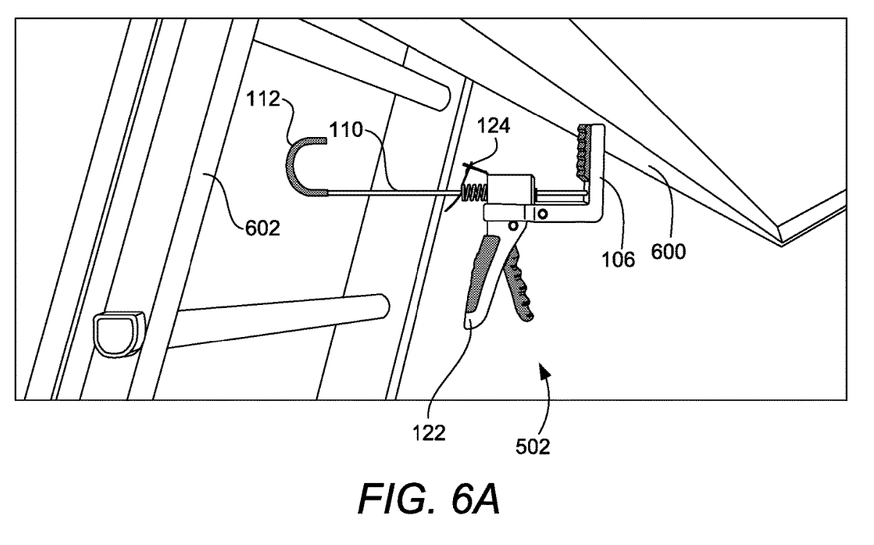
Figure 6B:
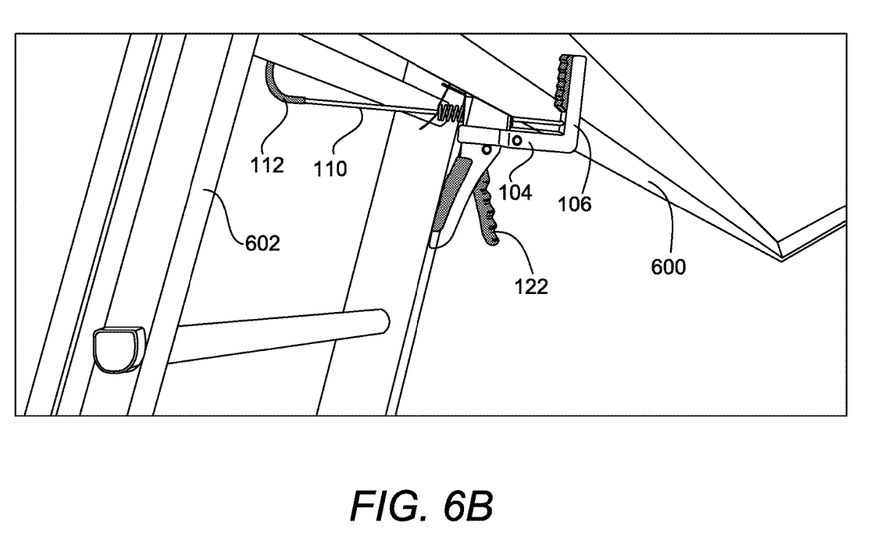
FIG. 6B illustrates a rod being displaced in an exemplary fastening direction, in accordance with an embodiment of the present invention.

FIGS. 6A and 6B illustrate perspective views of a fastening apparatus fastening an exemplary climbing assembly to an exemplary mounting surface, where FIG. 6A illustrates a rod being displaced in an exemplary release direction, and FIG. 6B illustrates a rod being displaced in an exemplary fastening direction. In one aspect, the fastening apparatus may be configured to enable efficient, one-handed fastening and release between a climbing assembly 602 and a mounting surface 600. In some embodiments, the climbing assembly may include, without limitation, a ladder having a plurality of rungs, a step ladder, a scaffold, and a catwalk. The mounting surface may include, without limitation, a roof eave, a tree having branches, a framework of a building, a boat, and an airplane.

Thus, the fastening apparatus may be made in variations in which the size, shape, and design of any and/or all of its portions can vary to accommodate specific points of use. For example, variations may be made intended for application of the gripping platform upon an eave, and for specific use to access a rooftop, while another variation could include a clamp for securement upon a fence.

Figure 7A:
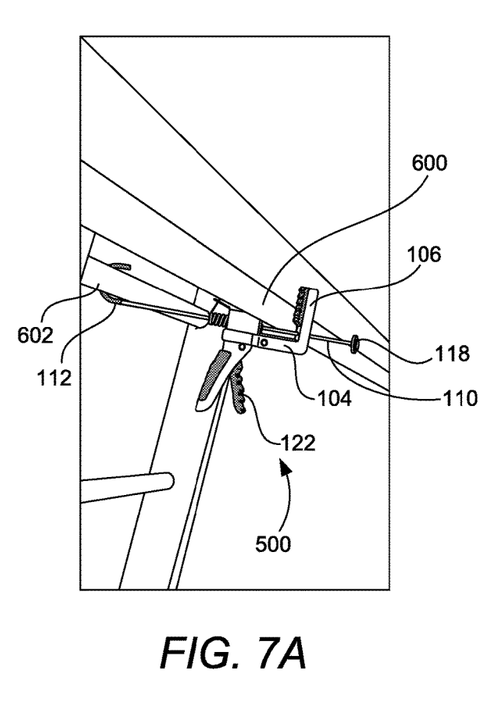
Figure 7B:
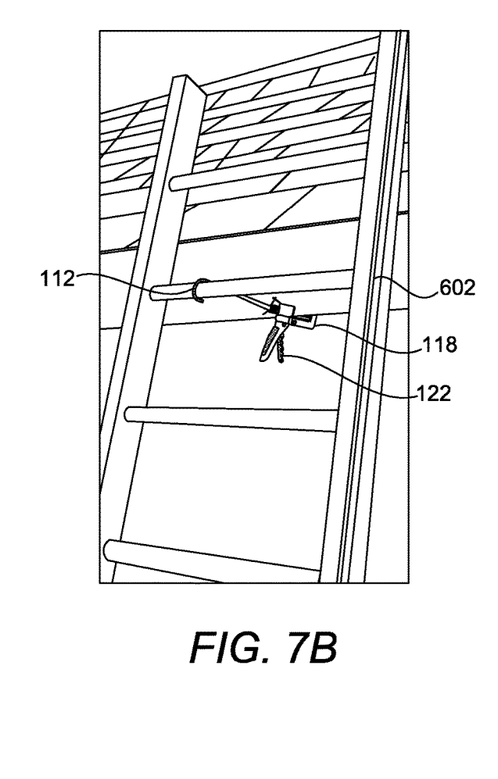
FIG. 7B illustrates a view from a climbing assembly, in accordance with an embodiment of the present invention.

FIGS. 7A and 7B illustrate perspective views of a fastening apparatus fastening an exemplary climbing assembly to an exemplary mounting surface, where FIG. 7A illustrates a view from beneath a mounting surface, and FIG. 7B illustrates a view from a climbing assembly. In one aspect, the exact positioning of the fastening apparatus relative to the mounting surface or climbing assembly is flexible. The user may adjust the proximal end to create the optimal tension.

However, as shown in FIG. 7A, the proximal end of the rod is slightly more elevated than the anchor portion and the mounting surface. This creates the optimal inward and downward tension. In one embodiment, this positioning secures a ladder in position during use, ensures safe exit from and entry to its top point of placement, and with a very simple and easy-to-use manipulations of the fastening apparatus.

Figure 8:
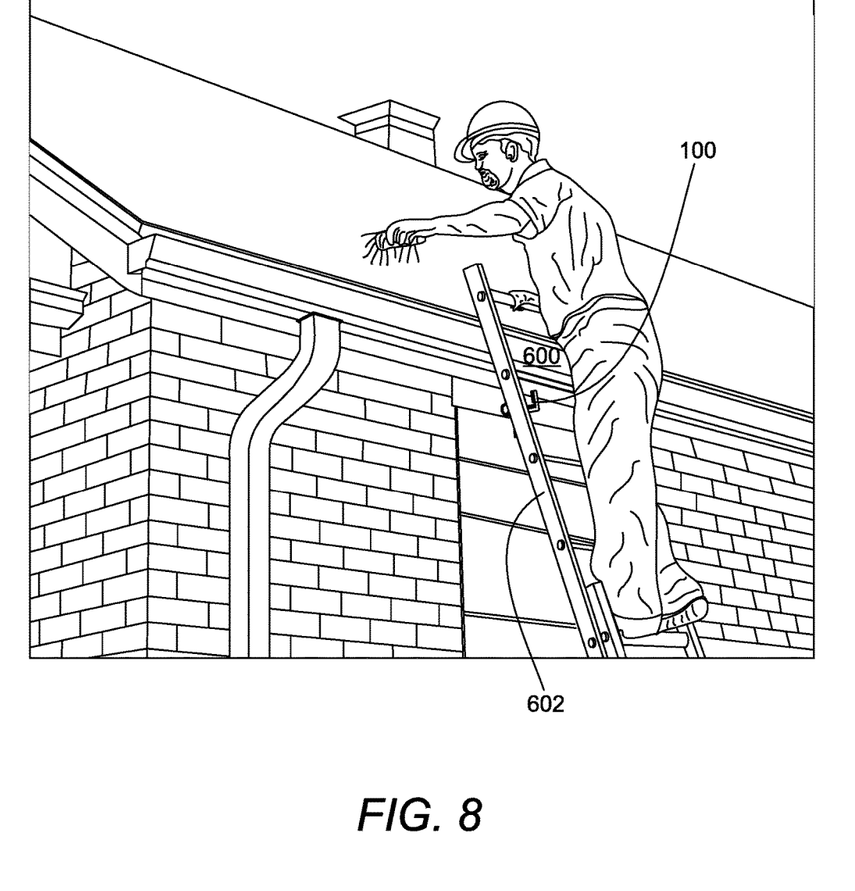
FIG. 8 illustrates a perspective view of a user operating a climbing assembly fastened to a mounting surface, in accordance with an embodiment of the present invention.

FIG. 8 illustrates a perspective view of a user operating a climbing assembly fastened to a mounting surface. In one exemplary operational use of the fastening apparatus, after applying a ladder in position for its use, a user may climb said ladder while safely carrying the fastening apparatus. With one hand the user may then position the fastening apparatus so that the base of the anchor portion is positioned in alignment with and directly behind the interior vertical wall of an eave, and with the hook-shaped proximal end of the rod in position with the rung of the ladder just above said eave.

By depressing the operating lever, the rod is displaced towards the fastening direction, securing its hook upon the rung and creating securing pressure between the ladder and the hosting eave. The user may then safely use the ladder without risk of the ladder moving or sliding, and without subsequent risk of falling from said ladder. When the ladder is no longer needed, the user may depress the release portion with a thumb, which removes tension from the rod. This release allows the rod to slide backward towards the release position, thus allowing the fastening apparatus to be removed from its point of application.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a fastening apparatus that incrementally secures, and quickly releases a mobile climbing assembly to a mounting surface according to the present invention will be apparent to those skilled in the art. Various aspects of the invention have been described above by way of illustration, and the specific embodiments disclosed are not intended to limit the invention to the particular forms disclosed. The particular implementation of the fastening apparatus that incrementally secures, and quickly releases a mobile climbing assembly to a mounting surface may vary depending upon the particular context or application. By way of example, and not limitation, the fastening apparatus utilizes a ratcheting mechanism to incrementally apply an inward and downward tension between a ladder and a roof eave implementation; however, similar techniques may instead be applied to a fastening apparatus that secures a ladder to the frames of a building being constructed, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. An apparatus comprising:
   an anchor portion said anchor portion comprising a base and a wall, said wall being disposed at an angle from said base;
   a rod, said rod comprising a proximal end and a distal end, said rod being configured to be incrementally displaced in a fastening direction,
   wherein said displacement in a fastening direction includes moving said proximal end of said rod towards said wall of said anchor portion,
   said rod further being configured to be displaced in a release direction, whereby said displacement in a release direction includes moving said proximal end of said rod away from said wall of said anchor portion;
   a distal coil, said distal coil being disposed to at least partially encapsulate said rod, said distal coil being configured to create a tension between said proximal end of said rod and said wall of said anchor portion,
   wherein said tension at least partially resists displacement of said rod in said fastening direction,
   wherein said tension potentially expands said distal coil, causing said proximal end of said rod to be displaced in said release direction;
   a locking member, said locking member being configured to incrementally engage and remain engaged with a section of said rod while being displaced in said fastening direction, said incremental engagement being at least partially frictional,
   wherein a linear displacement of said rod in said fastening direction is substantially unconstrained,
   wherein a linear displacement of said rod in said release direction is substantially constrained;
   a handle portion, said handle portion being configured to operatively join with said locking member, said handle portion being configured to help urge said locking member in said fastening direction; and
   a release portion, said release portion being configured to operatively join with said locking member, said release portion further being configured to at least partially disengage said locking member from said rod,
   wherein a disengagement of said release portion from said rod releases said tension generated by said coil, causing displacement of said rod in said release direction.

2. The apparatus of claim 1, wherein said apparatus is configured to support a climbing assembly against a mounting surface.

3. The apparatus of claim 2, wherein said proximal end of said rod is configured to detachably join with said climbing assembly.

4. The apparatus of claim 3, wherein said wall of said anchor portion is configured to detachably join with said mounting surface.

5. The apparatus of claim 4, wherein said anchor portion comprises an L-shaped bracket.

6. The apparatus of claim 5, wherein said wall forms an angle relative to said base of said anchor point, said angle configured to be approximately between 1 degree and 10 degrees.

7. The apparatus of claim 6, further including a grip portion, said grip portion being configured to at least partially overlay said wall, said grip portion comprising at least one sloped ridge, said at least one sloped ridge being configured to enable enhanced grip between said mounting surface and said wall of said anchor portion.

8. The apparatus of claim 7, wherein said rod is approximately 12 inches in length and a quarter inch diameter.

9. The apparatus of claim 8, wherein said proximal end of said rod has a generally hook shape.

10. The apparatus of claim 9, further including a sleeve, said sleeve configured to at least partially receive said proximal end.

11. The apparatus of claim 10, wherein said sleeve is configured to enable enhanced grip between said climbing assembly and said proximal end of said rod.

12. The apparatus of claim 11, further including a terminal portion, said terminal portion disposed at said distal end of said rod, said terminal portion being configured to enable gauging of said distance between said apparatus and said mounting surface.

13. The apparatus of claim 12, wherein said terminal portion comprises a disc.

14. The apparatus of claim 13, wherein said locking member comprises a tab.

15. The apparatus of claim 14, wherein said handle portion comprises a stationary handle and a mobile handle.

16. The apparatus of claim 15, wherein said base of said anchor portion is configured to form a fulcrum for said handle portion.

17. The apparatus of claim 16, further including a proximal coil, said proximal coil is disposed to at least partially encapsulate said proximal end of said rod, said proximal coil being configured to create a secondary tension between said release portion and said locking member.

18. An apparatus consisting of:
- an anchor portion said anchor portion comprising a base and a wall, said wall being disposed at an angle from said base;
- a grip portion, said grip portion being configured to at least partially overlay said wall, said grip portion comprising at least one sloped ridge, said at least one sloped ridge being configured to enable enhanced grip between said mounting surface and said wall of said anchor portion;
- a rod, said rod comprising a proximal end and a distal end, said rod being configured to be incrementally displaced in a fastening direction,
- wherein said fastening direction is configured to move said proximal end of said rod towards said wall of said anchor portion,
- said rod further being configured to be displaced in a release direction, whereby said release direction is configured to move said proximal end of said rod away from said wall of said anchor portion;
- a terminal portion, said terminal portion being disposed at said distal end of said rod;
- a sleeve, said sleeve being configured to at least partially receive said proximal end,
- a distal coil, said distal coil being disposed to at least partially encapsulate said rod, said distal coil being configured to create a tension between said proximal end of said rod and said wall of said anchor portion,
- wherein said tension at least partially resists displacement of said rod in said fastening direction,
- wherein said tension potentially expands said distal coil, causing said proximal end of said rod to be displaced in said release direction;
- a locking member, said locking member being configured to incrementally engage and remain engaged with a section of said rod while being displaced in said fastening direction, said incremental engagement being at least partially frictional,
- wherein linear displacement of said rod is substantially unconstrained in said fastening direction,
- wherein linear displacement of said rod is substantially constrained in said release direction;
- a handle portion, said handle portion being configured to operatively join with said locking member, said handle portion being configured to help urge said locking member in said fastening direction; and
- a release portion, said release portion being configured to operatively join with said locking member, said release portion further being configured to at least partially disengage said locking member from said section of said rod,
- wherein disengagement of said release portion from said section of said rod releases said tension generated by said coil, causing displacement of said rod in said release direction.

* * * * *